(No Model.)
J. E. MINNITT & J. H. VICKERS.
AUTOMATIC TAP FOR BUNG HOLES.
No. 317,561. Patented May 12, 1885.
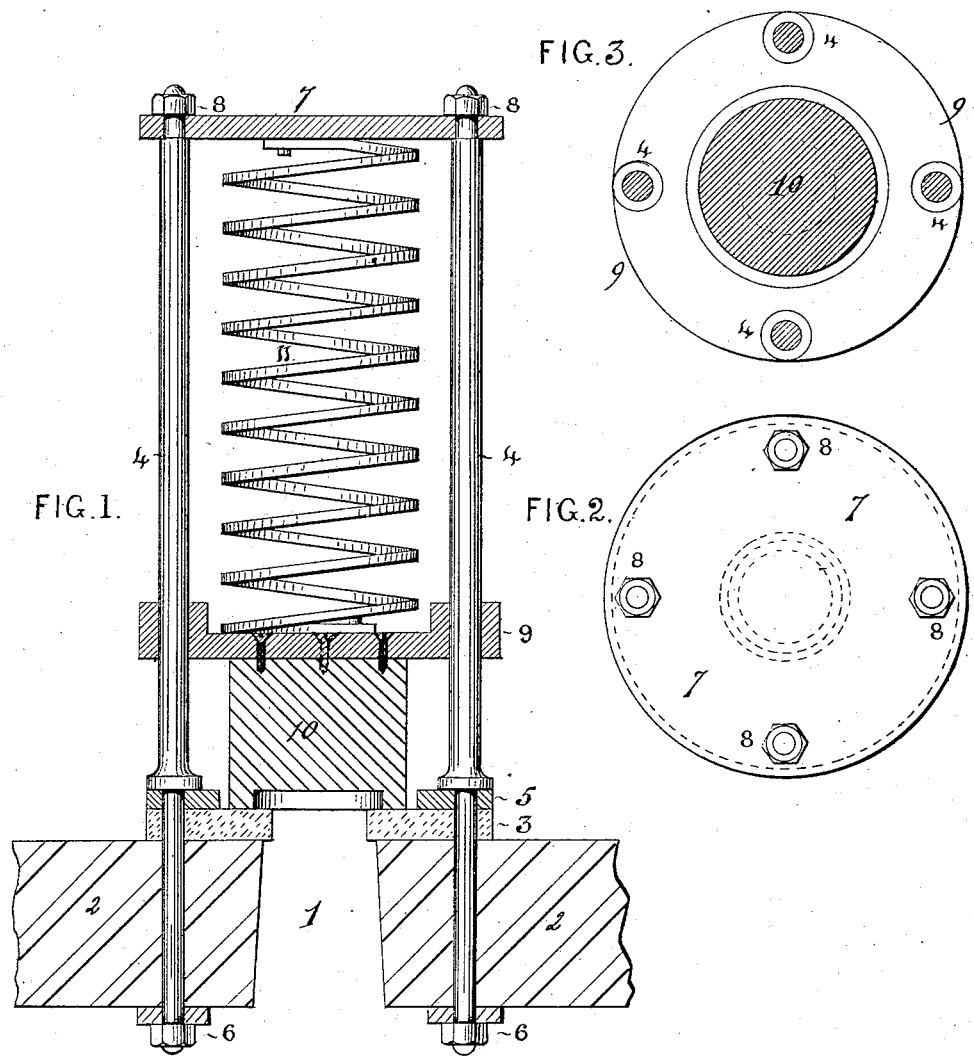

United States Patent Office.

JOHN ERNEST MINNITT AND JOHN HENRY VICKERS, OF NOTTINGHAM, ENGLAND.

AUTOMATIC TAP FOR BUNG-HOLES.

SPECIFICATION forming part of Letters Patent No. 317,561, dated May 12, 1885.

Application filed February 7, 1885. (No model.) Patented in England November 5, 1884, No. 14,634.

*To all whom it may concern:*

Be it known that we, JOHN ERNEST MINNITT, lace-manufacturer, and JOHN HENRY VICKERS, contractor, both subjects of the Queen of England, residing at Nottingham, England, have invented new and useful Improvements in Apparatus for Automatically Closing the Tap-Holes of Beer and other Casks or Vessels, rendering corks unnecessary, parts of the apparatus facilitating the operation of tapping, (for which they have made application for British Letters Patent, dated November 5, 1884, No. 14,634,) of which the following is a specification.
Our said invention has for its object the construction or arrangement of apparatus for fitting inside a beer or other cask or vessel for the purpose of automatically closing the tap-hole of a barrel on the withdrawal of a tap, thus rendering the insertion of a cork in the hole unnecessary, and by stopping the admission of air to the interior of the cask prevents fouling or other detrimental action in the cask or vessel. Part of the apparatus also facilitates the operation of tapping, rendering such operation less inconvenient and unpleasant by preventing the issue of the fluid in the vessel when inserting the tap.

Our invention consists in forming and fitting improved apparatus inside to the tap-holes of casks or vessels, in which apparatus there is a valve closed by a spring automatically on the withdrawal of a tap from such holes, and round such tap-holes there is also fitted a rubber ring, which prevents the contents of the cask or vessel escaping during the insertion of the tap.

The metal parts of the apparatus may be formed of brass or iron, and if of the latter the iron is treated by any well-known process whereby it is rendered non-corrosible, and consequently there can be no action between the beer or other liquid and the metal. The remaining parts, being of porcelain and rubber, are also not liable to chemical action.

Figure 1 on the accompanying sheet of drawings is a horizontal section taken through the tap-hole of a cask fitted with our improved apparatus, while Fig. 2 is an end view, and Fig. 3 a cross-section, which will be hereinafter explained.

The tap-hole 1 is fitted inside the cask 2 (part only of which is shown) with a flat rubber or caoutchouc ring, 3, which slightly overlaps the tap-hole 1 and acts as a valve-seating. This rubber ring 3 has formed through it four holes to receive four rods, 4, and over the rubber ring 3 there is placed a flat metal ring, 5, of equal diameter to the ring 3, but having a larger bore. This metal ring 5 has also four holes formed through it, through which holes and through the holes in the rubber ring 3 there are passed the ends of four short metal rods, 4. These rods 4 are fitted through holes formed for them in the material of the cask, and have screw-threads formed at their outer ends to receive screw-nuts 6, for securing the rods in position. The rods 4 have shoulders formed on them at such a distance from their outer ends as to allow room for the thickness of the cask and the thickness of the two rings 3 5, against the last of which, 5, the shoulders bear. By the action of the screw-nuts 6 the shoulders of the rods 4 are pressed against the metal ring 5, compressing the rubber ring 3, which, by its elasticity, effectually closes the holes in the cask through which the ends of the rods 4 pass, and thus prevents leakage. The inner ends of the rods 4 are formed with screw-threads and have shoulders on them at a little distance from the ends. On these inner ends there is placed a circular metal plate, 7, which is secured in position against the shoulders by screw-nuts 8. Between this circular plate 7 and the tap-hole 1 there is arranged to slide a circular metal plate, 9, of about the same diameter as the rubber ring 3. This plate 9 has four tubular bosses round its edges, through which the rods 4 can pass freely, the plate 9 being guided by these rods 4. On the side of this plate 9 nearest the tap-hole 1 there is screwed a cylindrical plug, 10, of porcelain, formed with a recessed face. The face of this plug 10 acts as a valve, and is pressed against the rubber ring 3 by the action of a helical spring, 11, fitted between the plate 7 and the valve-plate 9. The plug-valve 10, by the action of the spring, automatically closes the tap-hole and maintains it closed until the insertion of a tap. The valve-plate 9 and plug 10 are pushed back away from the rubber ring 3. The bore of the rubber ring 3, being of less diameter than the end of the tap, will, by its elasticity, press against the tap during its entrance, and thus prevent any of the contents of the cask escaping until the tap is driven home and firmly secured. When thus secured, the end of the tap will project past the line of the rubber ring 3, and thus, by pressing the plug-valve 10 back, the contents of the cask may be withdrawn through the tap by means of the usual perforations in its end.

By using this invention the tap-hole of the vessel will be automatically closed on withdrawing the tap, thus dispensing with the present necessity of putting corks (or other stoppers) into such vessels when empty. The invention also enables the tap to be withdrawn from a barrel the contents of which, after tapping, are found to be "new" or not ready for use, and after such withdrawal the barrel may be left until its contents are properly matured without corking or anything being done to the barrel.

To avoid the contents of the vessel being tampered with before tapping, the exterior of the tap-hole may be sealed with paper or other suitable material, and in both modifications the rubber ring will, by its elastic action, prevent the issue of any liquid during the tapping operation.

In some cases the use of packing material round the tap itself may be dispensed with by making the bore of the tap-hole slightly smaller than at present, or by using a larger tap when employing the first modification.

We claim as our invention—

The combination, substantially as described, with the tap-hole of a barrel, a cylindrical valve, 10, having an annular recess in its outer face, a disk, 9, to which said valve is secured, the valve-seat 3, arranged to project over the edges of the tap-hole, the clamping-ring 5, spring 11, and head 7, of the rods 4, having their ends screw-threaded to receive nuts 5 and 8, respectively, and provided with shoulders, said parts being arranged for co-operation, for the purposes specified.

JOHN ERNEST MINNITT.
JOHN HENRY VICKERS.

Witnesses:
JAMES KIRBY,
LOCK MOORE.